United States Patent [19]

Kobayashi et al.

[11] Patent Number: 5,117,950
[45] Date of Patent: Jun. 2, 1992

[54] HYDRAULIC SHOCK ABSORBER CONTROLLER FOR A WHEEL CRANE

[75] Inventors: Takahiro Kobayashi, Himeji; Kiyotsuna Kuchiki; Yuzi Katayama, both of Kakogawa, Japan

[73] Assignee: Kabushiki Kaisha Kobe Seiko Sho, Kobe, Japan

[21] Appl. No.: 668,719

[22] Filed: Mar. 13, 1991

Related U.S. Application Data

[63] Continuation of Ser. No. 436,201, Nov. 14, 1989, abandoned.

[30] Foreign Application Priority Data

Nov. 14, 1988 [JP]  Japan ............................ 63-148665[U]

[51] Int. Cl.⁵ ................................ F16F 9/32
[52] U.S. Cl. ........................ 188/300; 91/437; 188/299; 254/423; 267/64.12
[58] Field of Search ............. 188/300, 299, 285; 91/437; 254/423; 267/64.12

[56] References Cited

U.S. PATENT DOCUMENTS

| | | | |
|---|---|---|---|
| 2,530,286 | 11/1950 | Catranis | 188/300 X |
| 4,170,279 | 10/1979 | Pelletier | 188/300 |
| 4,779,418 | 10/1988 | Artzberger | 91/437 |

FOREIGN PATENT DOCUMENTS

| | | | |
|---|---|---|---|
| 19469 | 12/1955 | Fed. Rep. of Germany | 254/423 |
| 94003 | 7/1980 | Japan | 91/437 |
| 176807 | 9/1985 | Japan | 188/285 |
| 63-21115 | 2/1988 | Japan | . |

*Primary Examiner*—George E. A. Halvosa
*Attorney, Agent, or Firm*—Oblon, Spivak, McClelland, Maier & Neustadt

[57] ABSTRACT

A hydraulic shock absorber controller for a wheel crane having a suspension provided with hydraulic shock absorbers. The hydraulic shock absorber controller connects a line connected to the active chambers of the hydraulic shock absorbers and a line connected to the inert chambers of the same before the wheel crane starts running to enable the working fluid to flow rapidly from the compressed chamber to the expanding chamber of each hydraulic shock absorber so that the hydraulic shock absorbers are able to function properly for shock absorbing operation while the wheel crane is running.

2 Claims, 2 Drawing Sheets

HYDRAULIC SHOCK ABSORBER CONTROLLER FOR A WHEEL CRANE

This application is a continuation of application Ser. No. 07/436,201, filed on Nov. 14, 1989, now abandoned.

BACKGROUND OF THE INVENTION

1. Field of the Invention

The present invention relates to a hydraulic shock absorber controller for controlling the action of hydraulic shock absorbers incorporated into the suspension of a wheel crane, such as a rough terrain crane or a track crane.

2. Description of the Related Art

As shown in FIG. 3, a wheel crane is provided, in combination with suspension springs 3, with hydraulic shock absorbers 4 each having one end joined to a carrier frame 1 mounted with a revolving superstructure, not shown, and the other end joined to an axle 2. The hydraulic shock absorbers 4 absorb shocks and vibrations while the wheel crane is running. During crane work, the hydraulic shock absorbers 4 are locked so that the carrier frame 1 is unable to move relative to the axle 2 to restrain the unnecessary movement of the carrier frame 1 relative to the axle 2.

J.U.M. Provisional Pub. (Kokai) No. 63-21115 discloses a hydraulic shock absorber controller for controlling hydraulic shock absorbers in the foregoing manner, provided with a hydraulic circuit including a double check valve unit as shown in FIG. 2.

Referring to FIG. 2, the hydraulic shock absorber controller has a main selector valve (solenoid valve) 5 for controlling the hydraulic shock absorbers 4, connected through a double check valve unit 6 to the hydraulic shock absorbers 4. The double check valve unit 6 comprises an active line 7 connected to the active chambers 4a of the hydraulic shock absorbers 4, an inert line 8 connected to the inert chambers 4b of the hydraulic shock absorbers 4, a first valve 9 provided on the active line 7, a second valve 10 provided on the inert line 8, a pilot line 11 for transmitting a pilot pressure, and an auxiliary selector valve (solenoid valve) 12 connected to the pilot line 11. Pumps 13 are connected respectively to the main selector valve 5 and the auxiliary selector valve 12. The working fluid is returned to a sump 14.

The main selector valve 5 is a three-position selector valve having a first position a for connecting the active line 7 and inert line 8 of the double check valve unit 6 and connecting the active line 7 and the inert line 8 to the sump 14, a second position b for supplying the working fluid through the active line 7 of the double check valve unit 6 to the active chambers 4a of the hydraulic shock absorbers 4, and a third position c for supplying the working fluid through the inert line 8 to the inert chambers 4b of the hydraulic shock absorbers 4.

The auxiliary selector valve 12 is a two-position selector valve having a first position a for applying the pilot pressure to the double check valve unit 6 to open both the lines 7 and 8 simultaneously, and a second position b for stopping the application of the pilot pressure to the double check valve unit 6.

While the wheel crane is running, the main selector valve 5 is set in the first position a as shown in FIG. 2, and the auxiliary selector valve 12 is set in the first position a. In this state, both the lines 7 and 8 of the double check valve unit 6 are open and the lines 7 and 8 are connected in the main selector valve 5. Consequently, the working fluid flows from the active chambers 4a of the hydraulic shock absorbers 4 to the inert chambers 4b of the same or flows in reverse according to the bumping motion of the wheel crane to absorb shocks.

Before the wheel crane starts crane work, the auxiliary selector valve 12 is set in the second position b to stop the application of the pilot pressure to the double check valve unit 6, the main selector valve is set in the second position b or the third position c to adjust the overall length of the hydraulic shock absorbers to a desired length, and then the main selector valve 5 is set in the first position a. Consequently, both the lines 7 and 8 of the double check valve unit 6 are closed to lock the hydraulic shock absorbers 4, so that the carrier frame 1 is restrained from movement relative to the axle 2.

The double check valve unit 6 is disposed near the hydraulic shock absorbers 4, and the main selector valve 5 is placed in the operator cab remote from the double check valve unit 6 and is connected to the ports A and B of the double check valve unit 6 by long lines 15 and 16, which applies a large resistance against the flow of the working fluid. Accordingly, the hydraulic shock absorbers 4 are unable to extend or contract properly to absorb shocks according to the quickly varying position of the axle 2 relative to the carrier frame 1 while the wheel crane is running on a rough road, because the resistance of the long lines 15 and 16 against the flow of the working fluid impedes the discharge of the working fluid from the compressed chambers of the hydraulic shock absorbers 4 and the supply of the working fluid to the expanding chambers of the hydraulic shock absorbers 4, so that the pressure in the compressed chambers of the hydraulic shock absorbers 4 increases excessively and cavitation occurs in the expanding chambers of the hydraulic hock absorbers 4, and hence the hydraulic shock absorbers 4 are unable to function properly for shock absorbing operation.

If the double check valve unit 6 is disposed near the main selector valve 5 placed in the operator cab, the double check valve unit 6 must be connected by long lines to the hydraulic shock absorbers 4, and hence the same problems arise.

SUMMARY OF THE INVENTION

Accordingly, it is an object of the present invention to provide a hydraulic shock absorber controller for a wheel crane having a suspension provided with hydraulic shock absorbers, capable of directly connecting the active chamber and inert chamber of each of the hydraulic shock absorber to enable the working fluid to flow rapidly from the compressed chamber to the expanding chamber so that the hydraulic shock absorbers are able to function properly for shock absorbing operation In one aspect of the present invent, a hydraulic shock absorber controller for a wheel crane having a suspension including at least one shock absorber includes a double check valve unit having an active line connected to an active chamber of the shock absorber and an inert line connected to an inert chamber of the shock absorber. The double check valve unit further comprises a pilot operated check valve in each of the active nd inert lines for preventing a discharge of fluid pressure from the active and inert chambers to lock the shock absorber, the check valves being responsive to a pilot pressure to open the active and inert lines. A main selector valve is connected to the active line and to the inert line and has a position for communicating the active line with the inert line. An auxiliary selector valve is provided for comprising a pilot valve for the check valves. A pilot operated bypass valve is provided in a bypass line connecting the active line and the inert line at a position between the check valves and the main selector valve. The bypass valve is responsive to a pilot pressure from the auxiliary selector valve for communicating the active line and the inert line at the bypass line. The active line and the inert line are thereby communicated via the bypass line substantially simultaneously with the active line and the inert line being opened by the check valves.

The hydraulic shock absorbers are able to function properly to absorb shocks and vibrations while the wheel crane is running, because the double check valve unit is set in the unlocking position and the bypass valve connects the compressed chamber and expanding chamber of each hydraulic shock absorbers directly so that the working fluid is able to flow between the compressed chamber and the expanding chamber against a small resistance.

Furthermore, since the flow rate of the working fluid flowing through the lines connecting the double check valve unit to the selector valve is reduced while the wheel crane is running, the pipes forming the lines may be of a small size, so that the weight and cost of the piping can be reduced.

BRIEF DESCRIPTION OF THE DRAWINGS

The above and other objects, features and advantages of the present invention will become apparent from the following description taken in conjunction with the accompanying drawings, in which.

DETAILED DESCRIPTION OF THE PREFERRED EMBODIMENT

Figure 1:
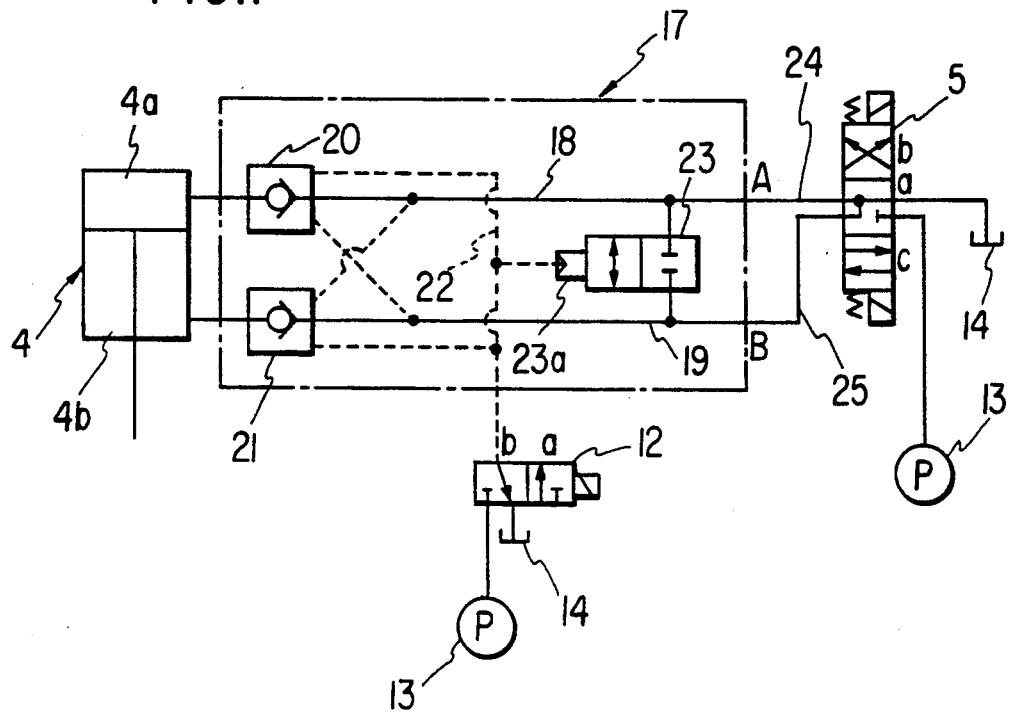
FIG. 1 is a hydraulic circuit diagram of a hydraulic shock absorber controller for a wheel crane, in a preferred embodiment according to the present invention.
Figure 2:
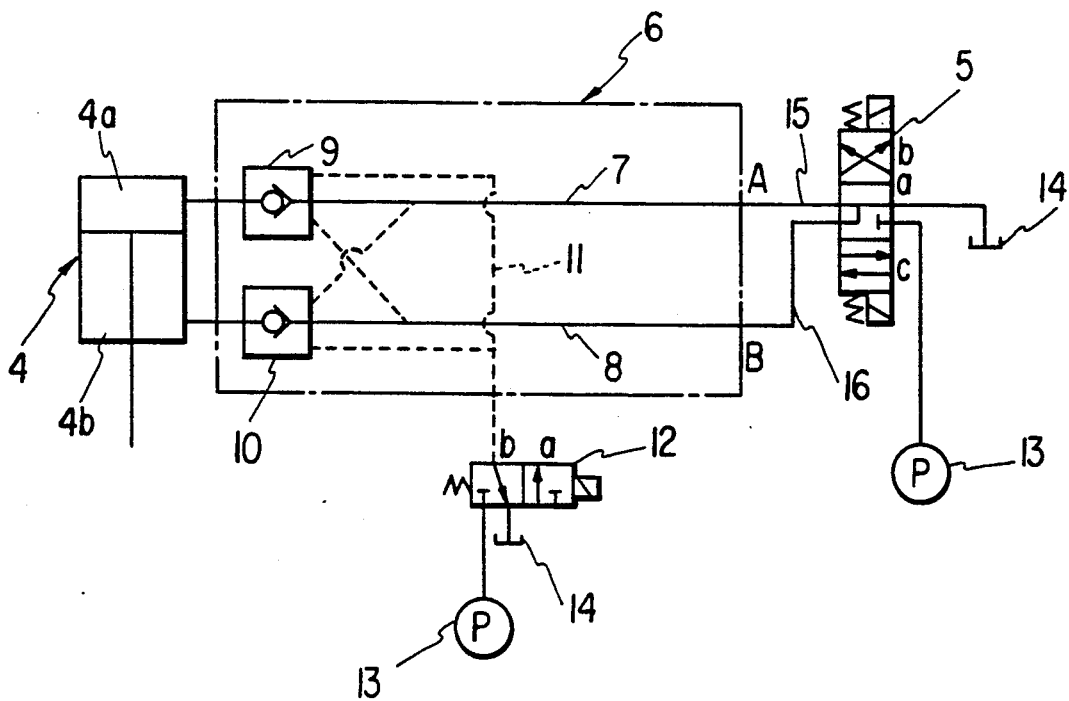
FIG. 2 is a hydraulic circuit diagram of a conventional hydraulic shock absorber controller for a wheel crane.
Figure 3:
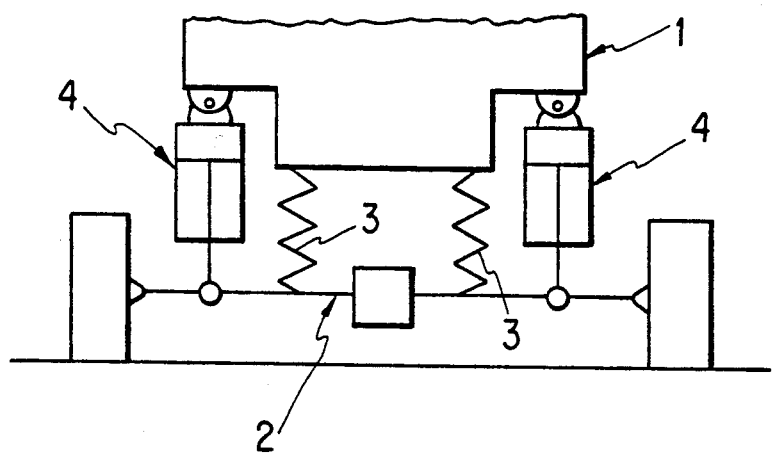
FIG. 3 is a schematic front elevation of a wheel crane having a suspension provided with hydraulic shock absorbers.

A hydraulic shock absorber controller in a preferred embodiment according to the present invention will be described with reference to FIG. 1, in which parts like or corresponding to those previously described with reference to FIG. 2 are denoted by the same reference characters and the description thereof will be omitted to avoid duplication.

The hydraulic shock absorber controller comprises: a main selector valve 5 (a three-position selector valve); an auxiliary selector valve 12 (a two-position selector valve); a double check valve unit 17 comprising an active line 18 having one end connected to a port A connected to the main selector valve 5 and the other end connected to the active chambers 4a of the hydraulic shock absorbers 4 (only one of a plurality of hydraulic shock absorbers 4 is shown) of a wheel crane, an inert line 19 having one end connected to a port B connected to the main selector valve 5 and the other end connected to the inert chambers 4b of the hydraulic shock absorbers 4, a first pilot operated valve 20 provided in the active line 18, a second pilot operated valve 21 provided in the inert line 19, a pilot line 22 connected to the auxiliary selector valve 12 to apply a pilot pressure to the first valve 20 and the second valve 21, and a bypass valve 23 (two-position selector valve) provided in a bypass line between the active line 18 and the inert line 19.

When the auxiliary selector valve 12 is set in a position a, a pilot pressure is applied to the pilot line 22 to control the first valve 20 and the second valve 21 so that both the lines 18 and 19 are opened simultaneously to set the hydraulic shock absorbers 4 in the unlocked state.

The bypass valve 23 has a pilot port 23a connected to the pilot line 22. When the auxiliary selector valve 12 is set in the position a, namely, when the double check valve unit 17 is set in an active position, the bypass valve 23 changes from a blocking position shown in FIG. 1 to a passing position to connect the active line 18 and the inert line 19, so that the discharge side and suction side of each hydraulic shock absorber 4 are connected directly through the double check valve unit 17. The resistance against the flow of the working fluid between the active chamber 4a and the inert chamber 4b of the hydraulic shock absorber 4 through he double check valve unit 17 is far less tan that against the flow of the working fluid through the main selector valve of the conventional hydraulic shock absorber controller, so that the hydraulic shock absorbers 4 are able to function properly for shock absorbing operation. Since the auxiliary selector valve 12 operates both the first and second pilot operated valves 20 and the bypass valve 23, the active line and the inert line are communicated via the bypass line substantially simultaneously with the active and inert lines being opened by the valves 20 and 21.

While the wheel crane is running, only on amount of the working fluid corresponding to the difference in pressure receiving area between the active chamber 4a and the inert chamber 4b flows through the main selector valve 5 to the sump 14 when the hydraulic shock absorber 4 contracts. Therefore, lines 24 and 25 respectively connecting the ports A and B of the double check vale unit 17 to the main selector valve 5 may be pipes of a small size., which facilitates piping fabrication, reduces the weight of the piping and reduces the piping cost.

Although it is desirable to provide the bypass valve 23 in the double check valve unit 17 to reduce the resistance against the flow of the working fluid, the bypass valve 23 may be provided separately outside the double check valve unit 17 and connected to the double check valve unit 17 by piping. In the latter case, the bypass valve 23 may be substituted by a solenoid selector valve which is operated simultaneously with the auxiliary selector valve 12.

Although the invention has been described in its preferred form with a certain degree of particularity, obviously many changes and variations are possible therein. It is therefore to be understood that the present invention may be practiced otherwise than as specifically described herein without departing from the scope and spirit thereof.

We claim:

1. A hydraulic shock absorber controller for a wheel crane having a suspension including at least one shock absorber, said controller comprising:

a double check valve unit having an active line connected to an active chamber of said shock absorber and an inert line connected to an inert chamber of said shock absorber, said double check valve unit further comprising a pilot operated check valve in each of said active and inert lines for preventing a discharge of fluid pressure from said active and inert chambers to lock said shock absorber, said check valves being responsive to a pilot pressure to pen said active and inert lines;

a main selector valve connected to said active line and said inert line and having a position for communicating said active line and said inert line;

an auxiliary selector valve comprising a pilot valve for said check valves; and a pilot operated bypass valve in a bypass line connecting said active line and said inert line at a position between said check valves and said main selector valve, said bypass valve being responsive to a pilot pressure from said auxiliary selector valve for communicating said active line and said inert line at said bypass line, whereby said active line and said inert line are communicated via said bypass line substantially simultaneously with said active line and said inert line being opened by said check valves.

2. A hydraulic shock absorber controller according to claim 1, wherein said main selector valve is placed in the operator cabin of the wheel crane, and the double check valve unit is disposed near the hydraulic shock absorbers.

* * * * *